United States Patent
Han

(10) Patent No.: US 8,948,162 B2
(45) Date of Patent: Feb. 3, 2015

(54) METHOD AND APPARATUS FOR PROCESSING VOIP DATA

(71) Applicant: Samsung Electronics Co., Ltd., Gyeonggi-do (KR)

(72) Inventor: Yonghee Han, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 68 days.

(21) Appl. No.: 13/751,657

(22) Filed: Jan. 28, 2013

(65) Prior Publication Data

US 2013/0195103 A1    Aug. 1, 2013

(30) Foreign Application Priority Data

Jan. 26, 2012  (KR) ................ 10-2012-0007763

(51) Int. Cl.
*H04L 12/66* (2006.01)
*H04M 1/253* (2006.01)

(52) U.S. Cl.
CPC .................................. *H04M 1/2535* (2013.01)
USPC ......................................... 370/352; 370/493

(58) Field of Classification Search
USPC .............. 370/230, 230.1, 235, 352–356, 389, 370/392, 400–401, 428, 437, 462, 465, 493
See application file for complete search history.

(56) References Cited

U.S. PATENT DOCUMENTS

| | | | | |
|---|---|---|---|---|
| 6,556,563 B1* | 4/2003 | Yarlagadda | .................... | 370/352 |
| 8,670,763 B1* | 3/2014 | Oroskar et al. | ............... | 455/437 |
| 2002/0015387 A1* | 2/2002 | Houh | ............... | 370/250 |
| 2007/0237138 A1* | 10/2007 | Milstein et al. | ............... | 370/389 |
| 2007/0280209 A1* | 12/2007 | Ramani | .................... | 370/356 |
| 2007/0280225 A1* | 12/2007 | Forbes et al. | .................... | 370/389 |
| 2008/0037440 A1* | 2/2008 | Politowicz | .................... | 370/253 |
| 2008/0117897 A1* | 5/2008 | Criddle et al. | ............... | 370/389 |
| 2009/0147778 A1* | 6/2009 | Wanless et al. | ............... | 370/389 |
| 2009/0168762 A1* | 7/2009 | Lugt et al. | .................... | 370/352 |
| 2010/0273417 A1* | 10/2010 | Tian et al. | .................... | 455/41.2 |
| 2010/0273475 A1* | 10/2010 | Lee et al. | .................... | 455/426.1 |
| 2011/0200048 A1* | 8/2011 | Thi et al. | .................... | 370/392 |
| 2013/0201852 A1* | 8/2013 | Chou et al. | .................... | 370/252 |
| 2013/0216027 A1* | 8/2013 | Rados et al. | ............... | 379/32.01 |
| 2013/0250828 A1* | 9/2013 | Chou et al. | .................... | 370/311 |

\* cited by examiner

*Primary Examiner* — Kevin Mew
(74) *Attorney, Agent, or Firm* — The Farrell Law Firm, P.C.

(57) ABSTRACT

A system and method for processing Voice over Internet Protocol (VoIP) data including determining whether received audio data is VoIP data, transferring, when received audio data is VoIP data, the received VoIP data to a first path, and transferring, when received audio data is not VoIP data, the received audio data to a second path. The system and method can process, when received audio data is VoIP data, the received VoIP data via a VoIP data processing path including a voice engine for VoIP, instead of an audio data processing path, irrespective of types of mobile devices and types of applications.

6 Claims, 4 Drawing Sheets

METHOD AND APPARATUS FOR PROCESSING VOIP DATA

PRIORITY

This application claims priority under 35 U.S.C. §119(a) to a Korean patent application filed on Jan. 26, 2012 in the Korean Intellectual Property Office and assigned Serial No. 10-2012-0007763, the entire disclosure of which is hereby incorporated by reference.

BACKGROUND OF THE INVENTION

1. Field of the Invention

The present invention relates generally to processing Voice over Internet Protocol (VoIP) data, and more particularly, to a system and method that processes VoIP data in paths, during a VoIP call, preventing voice delays.

2. Description of the Related Art

With the increasing use of smart phones, smart phone applications are being developed for many purposes. A Voice over Internet Protocol (VoIP) call application is popular with smart phone users since it can save users communication charges. This motivates most Social Network Service (SNS) applications to implement the VoIP call function. Thus, a VoIP call application is becoming one of the primary applications in smart phones.

Users who have fixed-priced Internet access are likely to make a voice call using VoIP to reduce extra communication charges. However, voice calls using VoIP are of lower quality than traditional communication network calls, for example using the Public Switched Telephone Network (PSTN). One of the important factors to determine the quality of a telephone call is related to a voice delay time. As described in Recommendation G.114 by the Telecommunication Standardization Sector of the International Telecommunication Union, (ITU-T Rec. G. 114), a voice delay time of approximately 200 ms may cause users to be inconvenienced during the call.

FIG. 1 is a diagram illustrating an audio data processing path when a conventional system performs a voice call using VoIP.

Referring to FIG. 1, the conventional system processes VoIP data and audio data in the same path. Since an Operating System (OS) on a Java Virtual machine allows a VoIP call to be processed via a number of audio data processing paths, this causes a relatively high voice delay in time, approximately 400~600 ms, irrespective of types of mobile devices or types of applications for VoIP. Consequently, the voice call quality is deteriorated and users are inconvenienced during the call.

SUMMARY OF THE INVENTION

Accordingly, the present invention has been made in view of the above problems and/or disadvantages, and the present invention provides a system and method for processing audio data via one path and VoIP data via another path during a VoIP call, determining whether received audio data is VoIP data, and selecting an AU audio data processing path according to the determination.

According to an embodiment of the present invention, there is provided a method for processing Voice over Internet Protocol (VoIP) data, including determining whether received audio data is VoIP data, transferring, when received audio data is VoIP data, the received VoIP data to a first path, and transferring, when received audio data is not VoIP data, the received audio data to a second path.

According to another embodiment of the present invention, there is provided a system for processing Voice over Internet Protocol (VoIP) data, including a VoIP voice engine for processing only VoIP data, an audio processing unit for processing audio data except for VoIP data, and a controller. The controller receives audio data and determines whether the received audio data is VoIP data. When the received audio data is VoIP data, the controller transfers the received VoIP data to a first path. When the received audio data is not VoIP data, the controller transfers the received audio data to a second path.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EMBODIMENTS OF THE PRESENT INVENTION

Hereinafter, various embodiments of the present invention are described in detail with reference to the accompanying drawings. The same or similar reference numbers are used throughout the drawings to refer to the same or similar components. Detailed descriptions of well-known functions and structures are omitted to avoid obscuring the subject matter of the present invention.

In the following description, processing audio data refers to converting electrical signals to audible signals or vice versa.

Figure 2:
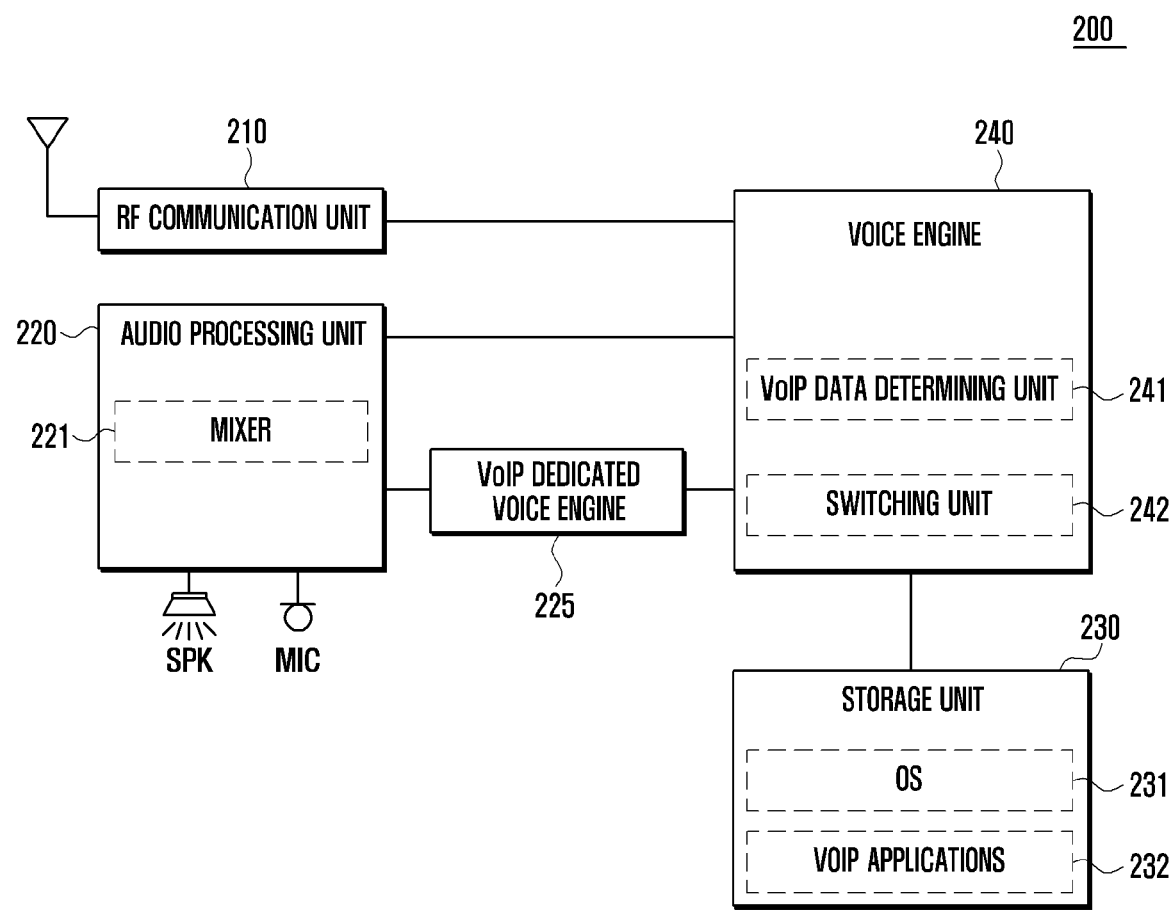
FIG. 2 is a schematic block diagram of a system for processing VoIP data, according to an embodiment of the present invention.

FIG. 2 is a schematic block diagram of a system for processing VoIP data, according to an embodiment of the present invention. As illustrated in FIG. 2, the VoIP data processing system 200 includes a Radio Frequency (RF) communication unit 210, an audio processing unit 220, a VoIP dedicated voice engine 225, a storage unit 230 and a controller 240.

The RF communication unit 210 performs data transmission and reception for the audio data processing system 200 in wireless mode. The RF communication unit 210 includes an RF transmitter for up-converting the frequency of signals to be transmitted and amplifying the signals and an RF receiver for low-noise amplifying received RF signals and down-converting the frequency of the received RF signals. The RF communication unit 210 receives data via an RF channel and transfers it to the controller 240. The RF communication unit 210 also transmits data, output from the controller 240, via the RF channel.

The RF communication unit 210 receives/transmits audio data from/to the external systems. Thus, the RF communication unit 210 can transmit/receive VoIP data during a VoIP call.

The audio processing unit 220 includes coders and decoders (CODECs). The CODECs include a data CODEC for processing packet data, etc. and an audio CODEC for processing audio signals, such as voice signals, etc. The audio CODEC converts digital audio signals into analog audio signals and outputs them via a Speaker (SPK). The audio CODEC also converts analog audio signals, received via a Microphone (MIC), into digital audio signals.

The VoIP data processing system 200 determines whether received data includes VoIP data, and processes it via first and second paths, according to the determination results. To this end, the audio processing unit 220 includes a mixer 221. The mixer 221 mixes VoIP data processed via the first path with audio data processed via the second path.

When an Android based OS is installed on the voice data processing system 200, the mixer 221 may be implemented using Advanced Linux Sound Architecture (ALSA) plugins such as dmix, dsnoop and asym plugins, serving as software mixers.

The VoIP dedicated voice engine 225 processes only VoIP data from VoIP audio data.

When the controller 240 transfers VoIP data via the first path, the VoIP data is processed by the VoIP dedicated voice engine 225 and then output via the speaker of the audio processing unit 220. On the other hand, when the controller 240 transfers audio data via the second path, the audio data, except for VoIP data, is processed via the audio processing unit 220 and output via the speaker.

When the data is parallel-processed via the first and second paths, the mixer 221 may mix the VoIP data, processed via the first path, with the audio data processed via the second path.

As such, since the mixer 221 is designed to mix VoIP data with audio data, processed via the first and second paths, the system 200 can parallel-process the VoIP data and audio data. That is, during a VoIP call, the VoIP data processing system 200 can execute an audio application to play back audio data or to record it.

Although the audio processing unit 220 includes the mixer 221 and each performs respective functions, as described above, alternatively the audio processing unit 220 may be equipped with parts of the functions of the mixer 221.

The storage unit 230 stores data and programs required for the operation of the VoIP data processing system 200. The storage unit 230 includes a program storage area and a data storage area. The program storage area stores an Operating System (OS) for booting the VoIP data processing system 200 and controlling the entire operation of the system 200. The program storage area also stores an application for playing back multimedia contents, and applications related to the option functions, e.g., a camera function, an audio playback function, an image/video playback function, etc. The data storage area stores data created when the VoIP data processing system 200 is used, e.g., images, videos, a phone book, audio data, etc.

According to an embodiment of the present invention, the storage unit 230 stores an OS 231, for example an Android OS, and a VoIP application 232.

The controller 240 controls the entire operation of the components in the VoIP data processing unit 200. When the system 200 receives audio data, the controller 240 determines whether the received audio data is VoIP data and transfers audio data to corresponding paths. To this end, the controller 240 includes a VoIP data determining unit 241 and a switching unit 242.

When the system 200 receives audio data via the RF communication unit 210, the VoIP data determining unit 241 determines whether the received audio data is VoIP data. To this end, the VoIP data determining unit 241 checks the header of the received audio data, and identifies whether the destination is the VoIP application 232. When the VoIP data determining unit 241 ascertains that the destination of the received audio data is the VoIP application 232, it concludes that the received audio data is VoIP data. Alternatively, when the VoIP data determining unit 241 receives audio data and detects a preset value representing VoIP data in a specific field of the received audio data, it concludes that the received audio data is VoIP data.

When the VoIP data determining unit 241 ascertains that the received audio data is VoIP data, the switching unit 242 transfers the VoIP data to a first path. Conversely, when the VoIP data determining unit 241 ascertains that the received audio data isn't VoIP data, the switching unit 242 transfers the received audio data to a second path.

As described above, the VoIP data processing unit 200 processes the received audio data, via different paths, according to the types of received audio data. Specifically, when the received audio data is VoIP data, the VoIP dedicated voice engine 225 processes only the VoIP data via the first path. Consequently, the path for processing VoIP data is reduced, compared with conventional audio data processing systems, thereby preventing voice delays irrespective of types of mobile devices or types of VoIP applications.

Although the controller 240 includes the VoIP data determining unit 241 and the switching unit 242 and each performs respective functions, alternatively, the controller 240 may be equipped with parts of the functions of the VoIP data determining unit 241 and the switching unit 242.

Figure 3:
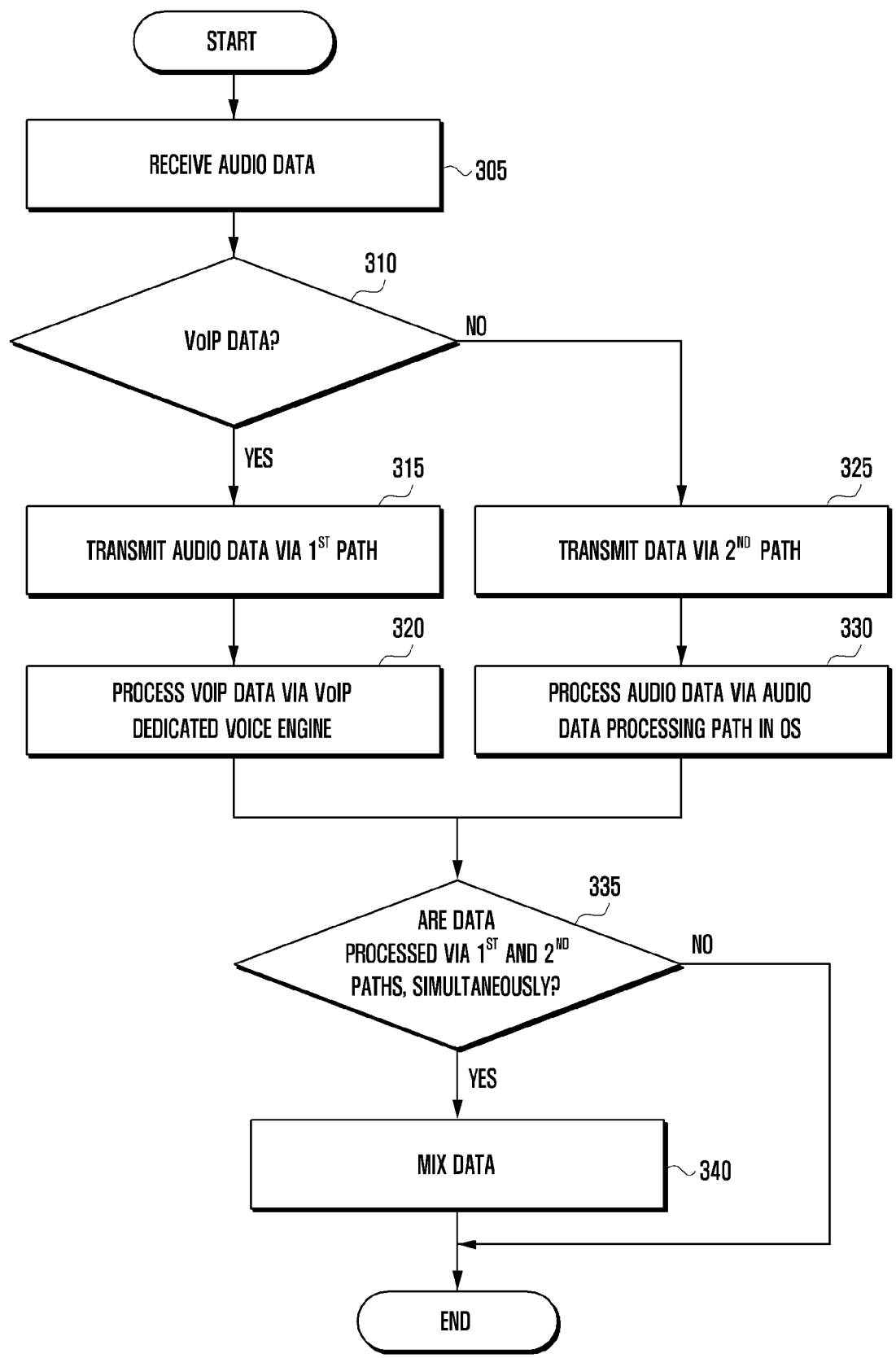
FIG. 3 is a flow chart illustrating a method for processing VoIP data, according to an embodiment of the present invention.

FIG. 3 is a flow chart illustrating a method for processing VoIP data, according to an embodiment of the present invention.

The controller 240 receives audio data via the RF communication unit 210, in Step 305, and determines whether it is VoIP data in Step 310.

The controller 240 checks the header of the received audio data, and identifies whether the destination is the VoIP application 232. When the controller 240 ascertains that the destination of the received audio data is the VoIP application 232, it concludes that the received audio data is VoIP data. Additionally, a particular value representing VoIP data may be set in a specific field. In that case, the controller 240 receives audio data and checks whether the preset value is included in a specific field of the received audio data. When the controller 240 detects the preset value in the specific field, it concludes that the received audio data is VoIP data.

When the controller 240 ascertains that the received audio data is VoIP data in Step 310, it transfers the VoIP data to a first path in Step 315. The controller 240 controls the VoIP dedicated voice engine 225 to process the VoIP data so that the audio processing unit 220 can process only the VoIP data in Step 320.

Conversely, when the controller 240 ascertains that the received audio data is not VoIP data in Step 310, the controller 240 transfers the received audio data to a second path in Step 325. After that, the controller 240 controls the audio processing unit 220 to process the received audio data via the audio data processing path provided by the OS in Step 330.

As described above, the received audio data is processed via different paths according to the types of received data. That is, when the received audio data is VoIP data, it is processed via the first path by the VoIP dedicated voice engine 225 that can process only VoIP data. This reduces the path for processing VoIP data, compared with conventional audio data processing systems, thereby preventing voice delays irrespective of types of mobile devices or types of VoIP applications.

After processing the received audio data via the first or second path, the controller 240 determines whether the data is parallel-processed via the first and second path in Step 335. When the controller 240 ascertains that the data is parallel-processed via the first and second path in Step 335, it controls the mixer 221 to mix the VoIP data processed via the first path with the audio data processed via the second path in Step 340.

Since the mixer 221 can mix data processed via the first and second paths, the system 200 can parallel-process VoIP data and general audio data. That is, during a VoIP call, the VoIP data processing system 200 can execute an audio application to play back audio data or to record it.

If an Android OS is installed on the voice data processing system 200, the mixer 221 may be implemented using Advanced Linux Sound Architecture (ALSA) plugins such as dmix, dsnoop and asym plugins, serving as software mixers.

Conversely, when the controller 240 ascertains that the data is not parallel-processed via the first and second path in Step 335, the controller 240 terminates the procedure.

Figure 4:
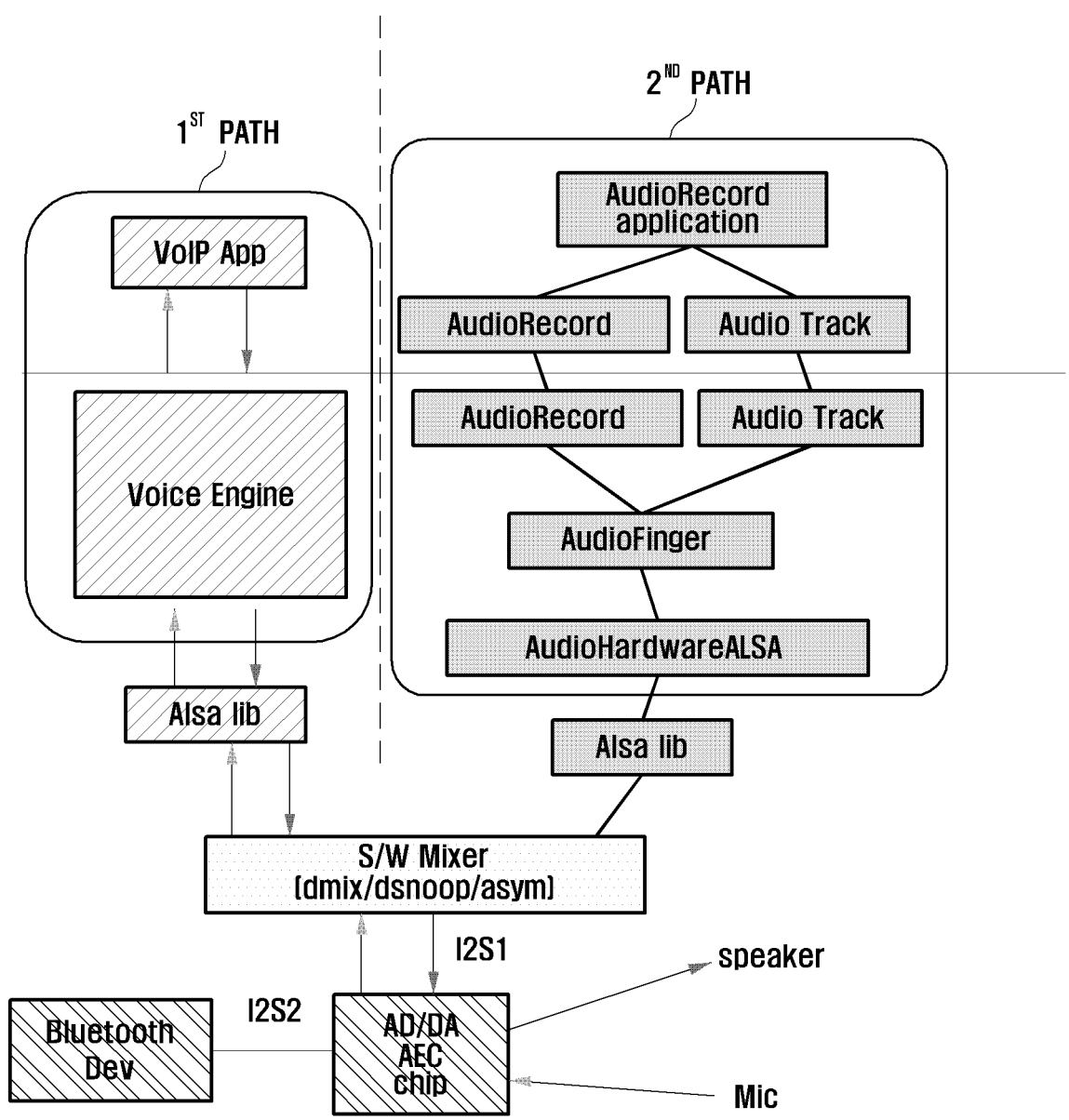
FIG. 4 is a diagram illustrating paths for processing audio data when a VoIP call is made, according to an embodiment of the present invention.

FIG. 4 is a diagram illustrating paths for processing audio data when a VoIP call is made, according to an embodiment of the present invention.

Figure 1:
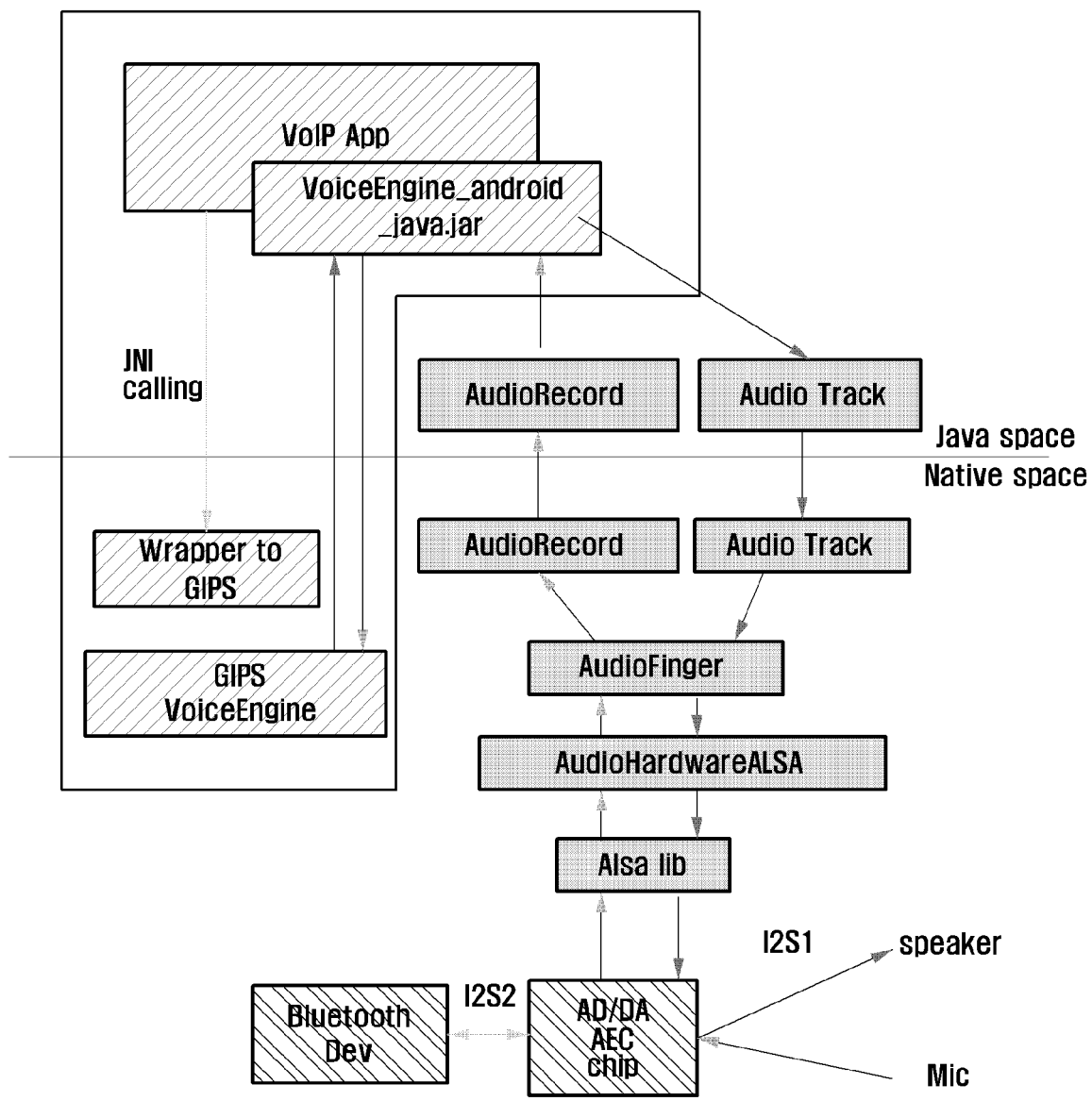
FIG. 1 is a diagram illustrating an audio data processing path when a conventional system performs a voice call using VoIP.

As illustrated in FIG. 4, the VoIP data processing unit 200 processes VoIP data via the first path and general audio data via the second path, unlike the path processing illustrated in FIG. 1 where VoIP data and general audio data is processed in the same path. In addition, the configuration of the first path is simpler than the second path. This can reduce time to process VoIP data, thereby preventing voice delays.

As described above, the system and method for processing VoIP data according to the present invention processes, when received audio data is VoIP data, the received VoIP data via a VoIP data processing path including a voice engine for VoIP, instead of an audio data processing path, irrespective of types of mobile devices and types of applications.

Although various embodiments of the present invention have been described in detail herein, it will be apparent to those of ordinary skill in the art that variations and modifications in form and detail may be made without departing from the spirit and scope of the present invention, as defined by the appended claims.

What is claimed is:

1. A method for processing Voice over Internet Protocol (VoIP) data, comprising:
   determining whether received audio data is VoIP data;
   transferring, when the received audio data is VoIP data, the received VoIP data to a first path;
   transferring, when the received audio data is not VoIP data, the received audio data to a second path;
   parallel-processing data via the first path and the second path; and
   mixing, by a mixer, the VoIP data processed via the first path with the audio data processed via the second path,
   wherein an Operating System (OS) includes an Android OS, and
   wherein the mixer is configured using Advanced Linux Sound Architecture (ALSA) plugins, including dmix, dsnoop and asym plugins, serving as software mixers.

2. The method of claim 1, wherein transferring the received VoIP data to a first path comprises:
   processing the VoIP data via a VoIP voice engine that processes only VoIP data.

3. The method of claim 2, wherein transferring the received audio data to a second path comprises:
   processing the audio data according to an audio data processing path provided by the OS.

4. A system for processing Voice over Internet Protocol (VoIP) data, comprising:
   a VoIP voice engine configured to process only VoIP data;
   an audio processing unit configured to process audio data, except for VoIP data; and
   a controller configured to receive audio data, determine whether the received audio data is VoIP data, transfer, when the received audio data is VoIP data, the received VoIP data to a first path, transfer, when the received audio data is not VoIP data, the received audio data to a second path, and parallel-process data via the first path and the second path; and
   a mixer for mixing the VoIP data processed via the first path with the audio data processed via the second path,
   wherein an Operating System (OS) includes an Android OS, and
   wherein the mixer is configured using Advanced Linux Sound Architecture (ALSA) plugins, including dmix, dsnoop and asym plugins, serving as software mixers.

5. The system of claim 4, wherein the first path comprises:
   a path for processing the VoIP data via the VoIP voice engine.

6. The system of claim 5, wherein the second path comprises:
   a path for processing the audio data via the audio processing unit.

* * * * *